United States Patent [19]

Zhou et al.

[11] Patent Number: 5,744,668
[45] Date of Patent: Apr. 28, 1998

[54] PROCESS OF PRODUCING GASOLINE, DIESEL AND CARBON BLACK WITH WASTE RUBBERS AND/OR WASTE PLASTICS

[75] Inventors: Dinli Zhou, Beijing; Li Xing, Zucun Chemical Plant, Fangshan District, Beijing 102403, both of China

[73] Assignee: Li Xing, Beijing, China

[21] Appl. No.: 648,275

[22] Filed: May 15, 1996

[30] Foreign Application Priority Data

Aug. 8, 1995 [CN] China ............... 95 1 07978. 6

[51] Int. Cl.⁶ ........................................ C07C 1/00
[52] U.S. Cl. .................. 585/241; 585/648; 585/651
[58] Field of Search ..................... 585/241, 648, 585/651; 201/25; 208/400, 407

[56] References Cited

U.S. PATENT DOCUMENTS

| | | |
|---|---|---|
| 3,956,414 | 5/1976 | Oshima . |
| 3,996,022 | 12/1976 | Larsen . |
| 4,108,730 | 8/1978 | Chen et al. . |
| 4,118,281 | 10/1978 | Yan . |
| 4,175,211 | 11/1979 | Chen et al. . |
| 4,851,601 | 7/1989 | Fukuda et al. . |
| 5,158,983 | 10/1992 | Stapp ........................ 521/41 |
| 5,208,404 | 5/1993 | Lu . |
| 5,286,374 | 2/1994 | Chen . |
| 5,364,995 | 11/1994 | Kirkwood et al. ............ 585/241 |
| 5,414,169 | 5/1995 | Takahashi et al. . |

*Primary Examiner*—Glenn Caldarola
*Assistant Examiner*—Bekir L. Yildirim
*Attorney, Agent, or Firm*—Lowe, Price, LeBlanc & Becker

[57] ABSTRACT

The present invention provides a process for preparation of gasoline diesel and carbon black with waste rubber and waste plastics. The process comprises pyrolysis, purifying, catalytic cracking, and fractionation. The invention also relates to the catalyst used in the invention.

14 Claims, 1 Drawing Sheet

PROCESS OF PRODUCING GASOLINE, DIESEL AND CARBON BLACK WITH WASTE RUBBERS AND/OR WASTE PLASTICS

FIELD OF THE INVENTION

The present invention relates to a process for treating waste rubber and/or waste plastics, and more particularly to a process employing pyrolysis and catalytic cracking of waste rubber and/or waste plastics to produce gasoline, diesel and carbon black.

BACKGROUND OF THE INVENTION

Many methods for preparing gasoline and diesel with waste rubber and waste plastics are known.

PCT/US 92/10800 discloses a reaction carried out under negative pressure with a vacuum pump. The reaction is conducted strictly under a temperature below 438° C. to avoid gasifying sulfur typically present in the rubber. Because there is no essential procedure for desulfurization, denitrogenation and dechlorination in the process, it makes the content of sulfur in the product oil high (0.4–1.5 % by weight) and the oil unstable. This can erode the reaction device and generate a great deal of $SO_2$ and may pollute the environment. The conversion of the reactive materials also is not thorough, hence a low yield (47%) of the product oil and a high content (43%) of residue result due to the reactive low temperature (<438° C.).

A method published in U.S. Pat. No. 3,996,022 reacts waste rubber with acidic halides in a fused state, which method works in the laboratory. However, chloride ions at high temperature erode reactor components and this makes the method impractical in industry.

U.S. Pat. No. 5,208,404 teaches mixing waste rubber with a catalyst composed of various inorganic compounds such as calcium oxide and noble metals (Ni, Nb and Ti). Because the catalyst is not volatile in the reaction apparatus and ends up mixed with carbon black in the reactive residue, it is difficult to purify/recover it for reuse. Because the reaction occurs at a pressure of 2 $kg/cm^2$, the material for the reactor device has to be of high quality, and the cost is quite high. Also, the conversion yield is only 37%.

A catalytic reaction described in U.S. Pat. No. 4,108,730 is carried out with a complicated fluidized catalytic bed. A great deal of heavy oil has to be used for treating the crude rubber, hence the plant had to be located near a refinery. Sulfur dioxide of several folds more than that of the standard is yielded due to the high content of sulfur (about 1.1%). Similar processes are disclosed in U.S. Pat. No. 4,175,211 and U.S. Pat. No. 4,118,281.

U.S. Pat. No. 4,851,601 teaches an experimental process in which there is no device to drain residues. It is not utilized in industrial production because of a feed rate of only 680–706 g/hr. Also, there is a need for supplying inorganic porous zeolite in the apparatus to clear coke from the reactor wall. Moreover, the high reactive temperature (390°–500° C.), expensive apparatus, low yield of the product, and low RON (62.5) all make it impractical, and the process cannot be used to treat PVC.

U.S. Pat. No. 5,414,169 teaches a method in which plastics are mixed directly with a catalyst in a reactor and the pyrolysis reaction then practiced, with a catalytic reaction following in a liquid phase.

U.S. Pat. No. 5,286,374 discloses a fusion reaction carried out by directly mixing crude rubbers with a catalyst powder. The resultant carbon black contains some of the catalyst and therefore has low commercial worth. Because the reaction occurs at a pressure of 1–2.5 $kg/cm^2$, it needs an expensive device. In addition, the yield of the product hydrocarbon oil is relatively low. There is also a high sulfur content in the product due to absence of desulfurating and denitrifying procedures.

SUMMARY OF THE INVENTION

The present invention provides a method for producing gasoline, diesel and carbon black by using waste rubber (including tires) and/or waste plastics (including PVC). The process includes pyrolysis, desulfurizing and/or denitrogenating and/or dechlorinating, and catalytic cracking, carried out sequentially. According to the invention, waste rubber and/or waste plastics materials are charged into a pyrolysis reactor with a screw feeder or a reciprocating feeder. A spiral stirrer in the pyrolysis reactor is operated to stir the contents when the reactants are charged. After the pyrolysis reaction is completed, resulting carbon black is drained away with the spiral stirrer from the pyrolysis reactor vessel. Other resulting substances of gaseous phase having low molecular weight are subjected to a desulfurization denitrogenation and/or dechlorination step. Residual sulfur, nitrogen and chlorine are removed through a fixed bed, and catalytic cracking is simultaneously carried out. Materials in gaseous phase enter the device for catalytic cracking to undergo the reaction of catalytic cracking therein. The substances produced by the catalytic cracking are separated to give the desired products. The spiral stirrer arranged in the pyrolysis reactor according to the invention decreases coking of the reacting substances, and enhances the efficiency of conduction of heat. In addition, the stirrer is rotated clockwise during the pyrolysis reaction, but drains the carbon black away when rotated counter-clockwise. A special catalyst is employed in the invention, and the device for desulfurizing and/or denitrogenating and/or dechlorinating makes the life of the catalyst longer, and the range of materials treated wider (almost all plastics and rubbers). It solves problems known in the art.

The main chemical reaction of pyrolysis is as follows:

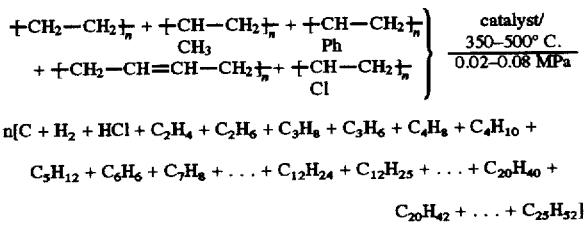

$$n[C + H_2 + HCl + C_2H_4 + C_2H_6 + C_3H_8 + C_3H_6 + C_4H_8 + C_4H_{10} +$$

$$C_5H_{12} + C_6H_6 + C_7H_8 + \ldots + C_{12}H_{24} + C_{12}H_{25} + \ldots + C_{20}H_{40} +$$

$$C_{20}H_{42} + \ldots + C_{25}H_{52}]$$

wherein, $C_5H_{12}$–$C_{12}H_{24}$ are components of gasoline, components of diesel are $C_{12}H_{26}$–$C_{20}H_{42}$, and combustible gases are $CH_4$–$C_4H_{10}$.

DETAILED DESCRIPTION OF THE INVENTION

Figure 1:
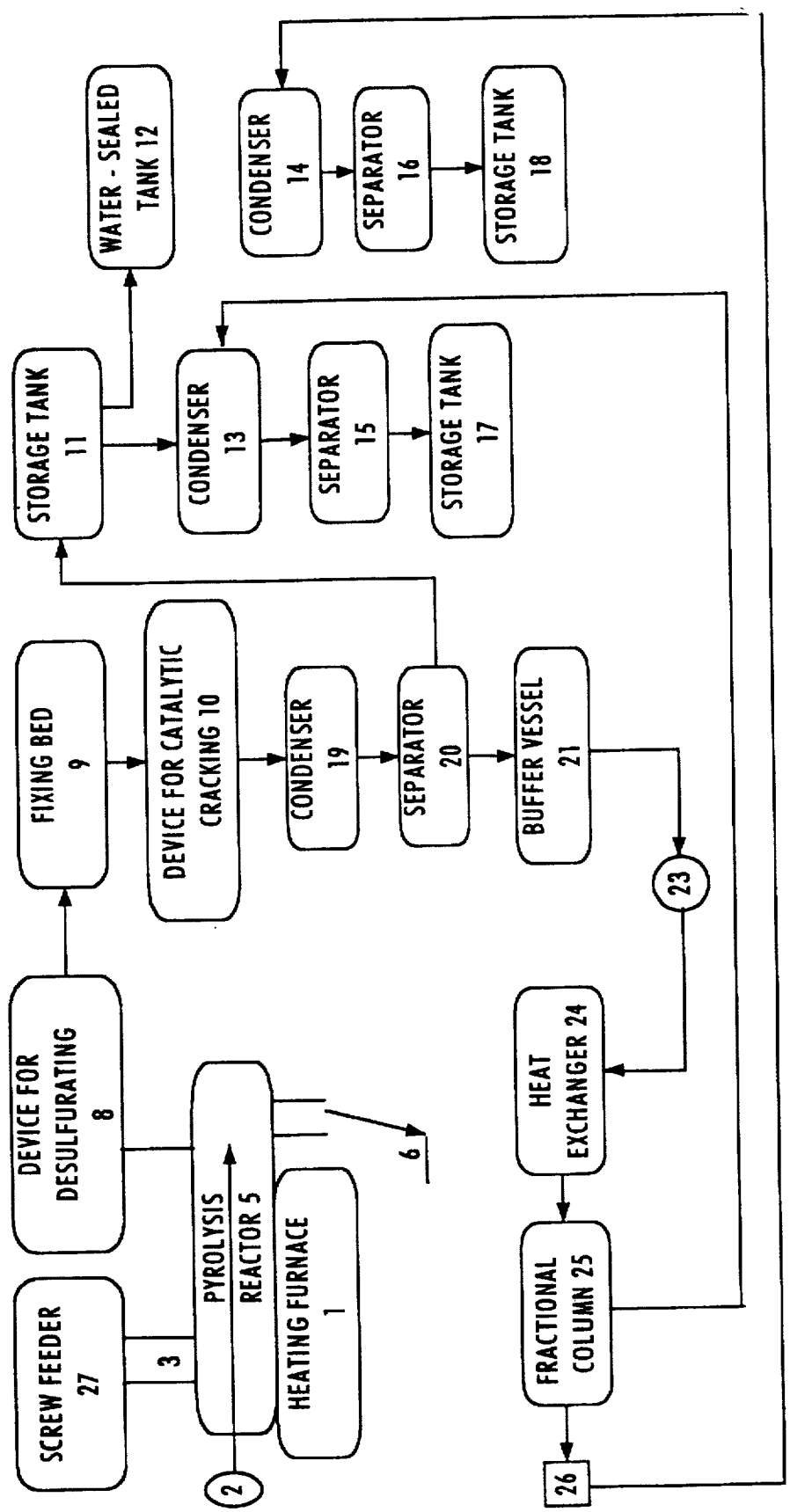
FIG. 1 is a schematic view of the reaction apparatus according to the invention, wherein the elements are:
screw feeder or reciprocating feeder
heating furnace
pyrolysis reactor
spiral stirrer
a first device, for desulfurization and/or denitrogenation and/or dechlorination
a second device, for desulfurization and/or denitrogenation and/or dechlorination, and for simultaneously carrying out the primary reaction of catalytic cracking a device for catalytic cracking, and a fractional column

According to preferred embodiments of this invention, waste rubber materials (NR, SR, SBR, BR, IR, CR, NBR, EPR, EPM and IIR) and/or waste plastics (PE, PP, PS, PVC, ABS, etc.) are pre-treated in known manner to remove impurities. A heating furnace 1 provides heat to a pyrolysis reactor 5 to control the temperature therein to 350°–500° C. The waste rubber and/or waste plastics treated are charged into the reactor 5 through feeding inlet 3. A spiral stirrer 2 in the reactor is operated to stir when the reactive materials enter. The waste rubber and waste plastics undergo a reaction of pyrolysis. In the reactor 5 they are decomposed to generate gaseous substances having low molecular weight.

If the materials were waste rubbers, they are entirely decomposed and carbon black residue is discharged out of the reactor through valve 6 under the action of spiral stirrer 2 and can be used for preparation of tires.

Through the top of pyrolysis reactor 5, substances of gaseous phase having lower molecular weight are directed to device 8 for desulfurization and/or denitrogeneration and/or dechlorination, in which base materials such as granular NaOH or KOH or the fused forms thereof are provided at a temperature of 350°–450° C. Most of the acidic gases such as HCl, $SO_2$, $SO_3$, $H_2S$, etc. resulting from pyrolysis are absorbed in the device 8. The gaseous substances from the device 8 enter a fixed bed 9, in which unabsorbed acidic gases and other odoriferous gases are removed and, simultaneously, the primary reaction of catalytic cracking proceeds.

A particular catalyst DL, prepared by the inventor, is used in the fixed bed 9. The gaseous substances from the fixed bed 9 are charged into a device 10 which, arranged as a fixed bed, is then used for catalytic cracking. A catalyst XL used in the device 10 also is produced by the inventor. The complete reaction of catalytic cracking of the gaseous substances from the device 9 is thus carried out, along with a series of other reactions such as folding reaction, reaction of hydrogen transfer and reaction of aromatization. Gasoline, diesel and other mixed components of combustible gases are obtained from these reactions. The reactions in the fixed beds 9 and 10 are carried out at a temperature of 200°–400° C., under a pressure of 0.02–0.08 MPa, at an air speed 1–2000 m/h.

The products of catalytic cracking from the device 10 are introduced into a condenser 19, in which they are cooled to room temperature. The resulting liquid is a mixture of gasoline and diesel. The materials from the device 19 enter buffer vessel 21 through a separator 20. The gases are charged into storage tank 11 from the top of separator 20 from which the combustible gas is introduced back into the heating furnace 1 to burn. Residual gas in the tank 11 is discharged into air to burn through a water-sealed tank 12. The liquid oil mix in the buffer vessel 21 is treated with inorganic acid such as sulfuric acid, and impurities are separated off. The oil mix is pumped into heat exchanger 24 with pump 23 to be heated to a temperature of 300°–400° C., then introduced into fractional column 25, in which gasoline and diesel are separated in different distillation cuts. Gasoline is introduced into condenser 14 from the top of column 25, and enters a gasoline storage tank 18 through separation facility 16 for removing oil and water. Diesel enters a stripper 26 from the middle of the fractional column 25.

Diesel is introduced into the condenser 13 after treatment by the overheated vapor, then enters the diesel storage tank 17 through the fractional column 25.

The catalyst DL in the fixed bed 9 is composed of a mixture of materials A and B, wherein the material A comprises 30–60% kaolin or activated clay, 10–30% aqueous solution of KOH or NaOH (10–20% of solid content), 10–20% CaO or $CaCO_3$ (content of CaO), 10–15% ZnO or soluble zinc salt, 3–8% CuO or a soluble lead salt, and a suitable amount of a binder of silicon or aluminum such as conventional binders used in the art, for example, sodium silicate. The materials are mixed, washed, dried and calcined at a temperature of 500°–700° C., and the catalyst DL is thus obtained. The ratio of silicon and aluminum is 12–200, preferably 16–20, of particle size 0.5–12 µm, preferably 0.8–1.8 µm, with a constraint index of 2–11. Material B is ZnNiHZSM-5 zeolite made from modified HZSM-5 zeolite with metal, prepared by soaking HZSM-5 zeolite with a salt solution of Zn, Ni or Ga, mixing with a suitable amount of a binder of Si or Al such as water glass, shaping, washing, drying, and calcining at 500°–700° C., wherein content of Zn is in the range 1–5% and preferably 3%; the content of Ni is in the range 0.5–5% and preferably 1.5; the ratio of Si and Al is in the range 20–200 and preferably 30–40; the particle size of the crystal is in the range 0.8–1.6 µm; and the constraint index is in the range 1–12 in the material B.

The ratio of the mixture of materials A and B may be varied by persons skilled in the art if desired. Preferably, it is prepared as a particulate.

The catalyst XL in the device 10 for catalytic cracking essentially comprises ZnNiHSM-5, zeolite REY, mercerized zeolite and ZnO or compounds containing Zn, Ga, Pb, Cu, Ni, Pt or Fe, and a suitable amount of synthetic carriers.

The zeolite REY is the zeolite NaY which is exchanged with rare earth, including 8–18% rare earth element (e.g., $Re_2O_3$), with a particle size of 0.8–8 µm. The mercerized zeolite is prepared with $NaAlO_2$ and silica sol, molar proportion of silicon/aluminum ($SiO_2/Al_2O_3$) 11–14 or higher, $Na_2O/SiO_2$ 0.17–0.19, and a particle size of 0.5–10.0 µm.

The synthetic carrier is prepared by adding a suitable amount of binders such as silicon-aluminum sol or silicon sol, etc., to kaolin.

The method for preparation of the catalyst XL is as follows:

1. 1374 kg 20% solution of sulfuric acid is added to 0.79 l aqueous solution of $Al_2(SO_4)_3$ (containing $Al_2O_3$ 46 g/l). The mixture is stirred homogeneously and cooled to room temperature. Then to the resultant is added 4.9 l sodium silicate (containing SiO2 120 g/l, modules 3.2–3.3) and 1700 kg kaolin. The synthetic carrier is thus obtained after stirring homogeneously;

2. To the mixture of 2–20% (by weight) ZnNiHZSM-5, 10–50% zeolite REY, 5–10% mercerized zeolite, and 3–8% ZnO or a compound containing Zn, Ga, Pb, Cu, Ni, Pt or Fe is added with a suitable amount of water. The resulting materials were stirred to homogeneity body to obtain a syrup of the active components; and 3. The synthetic carrier 40–60% (by weight) is mixed thoroughly with 60–40% (by weight) syrup of the active components, then dried and shaped, washed or not washed, calcined or not calcined, to yield the catalyst XL of the present invention.

EXAMPLE 1

1000 kg plastics waste was ground after removal of impurities. The material was then charged into the reactor 5 for pyrolysis via feeder inlet 3 through screw feeder or reciprocating feeder 27. The pyrolysis device 5 was heated with heating furnace 1 to keep the temperature of materials in the device at 350°–500° C. while the pyrolysis reaction of waste plastics was carried out and the material decomposed into gaseous hydrocarbons of small molecular weight. Gas from the device 5 was charged into the device 8 to remove acidic gases (e.g., HCl in PVC). Gaseous substances from the device 8 were further treated to remove the residual sulfur, chlorine and nitrogen by the catalyst DL in a fixing bed in the device 9, where the primary reaction of catalytic cracking proceeded. The substances from the device 9 entered into device 10 to perform the reaction of catalytic cracking. The temperature in the device 9 and 10 was 200°–400° C., and the pressure was in the range 0.02–0.08 MPa. The materials from the device 10 were separated, fractionated and condensed, and the oil and water separated to give gasoline 375 kg, diesel 375 kg. The heavy oil in the bottom of the fractionating tower went back into the pyrolysis reactor 5 to react. The RON of gasoline of the product was 90.5, dried point≦185° C. The cetane ratio of diesel of the product was 45–60. The 95% distillation range of diesel in the product was less than 290° C. (freezing point≦–30° C.).

Table 1–3 lists the compositions and properties of the product of Example 1.

EXAMPLE 2

In the same manner as in Example 1, 1000 kg waste rubber (e.g tires) were used, except that sulfuric acid was used to treat products from the catalytic cracking, to give gasoline 320 kg, diesel 220 kg and carbon black 320 kg. The absorptive value of iodine (mg/g) was 112–130, the ash content≦0.5, the tensile strength MPa≧30, the elongation %≧580 and the heated reduction≦2.5%.

Although the present invention has been described and illustrated in detail, it should be clearly understood that the same is by way of illustration and example only and is not to be taken by way of limitation, the spirit and scope of the present invention being limited only by the terms of the appended claims.

TABLE 1

Mass Balance of the Products of Example 1

| | Wt. % |
|---|---|
| Waste plastics | 100 |
| Gasoline | 37.5 |
| Diesel | 37.5 |
| $C_1$ to $C_4$ hydrocarbon gases | 15.0 |
| Solid residue | 10.0 |

TABLE 2

GC-MS Analysis of the Products of Example 1

| Compound | Wt. % |
|---|---|
| 1. Gaseous Products | |
| Hydrogen | 6.822 |
| Methane | 8.749 |
| Ethane | 8.239 |
| Ethylene | 6.835 |
| Propane | 8.659 |
| Propene | 23.672 |
| Isobutane | 2.389 |
| n-Butane | 1.148 |

TABLE 2-continued

GC-MS Analysis of the Products of Example 1

| Compound | Wt. % |
|---|---|
| 1-Butene+trans-2-butene | 1.811 |
| Isobutene | 22.688 |
| cis-2-Butene | — |
| Others | 5.038 |
| 2. Gasoline | |
| Propene | 0.43 |
| Isobutene | 1.03 |
| 2-Methylbutane | 0.08 |
| 1-Pentene | 0.27 |
| n-Pentane | 4.68 |
| Dimethylcyclopropane | 0.51 |
| 3-Methyl-1-butene | 0.22 |
| 2-Methyl-1-butene | 0.22 |
| 4-Methyl-1-butene | 0.11 |
| 2-Methyl-1pentene | 2.01 |
| Isohexadiene | 0.37 |
| Methylcyclopentane | 5.96 |
| 4-Methyl-2-pentene | 2.04 |
| Isohexadiene(??) | 0.34 |
| 2,4-Dimethyl-1-pentene | 1.76 |
| 3,4-Dimethyl-2-pentene | 0.57 |
| Benzene | 0.36 |
| Dimethylcyclopentane | 0.56 |
| n-Heptane | 0.28 |
| 4-Methyl-1,4-hexadiene | 0.66 |
| 4-Methyl-2-heptene | 0.97 |
| 2,3-Dimethylhexane | 5.14 |
| Toluene | 0.75 |
| Isononene | 0.63 |
| 2,3,4-Trimethylhexane | 1.56 |
| 2,3-Dimethyl-2-heptene | 5.07 |
| Trimethylcyclohexane | 3.49 |
| 2,4-Dimethyl-1heptene | 24.67 |
| Xylene | 1.98 |
| Trimethylcyclohexene | 1.52 |
| Isodecene | 4.86 |
| Mesitylene | 0.53 |
| n-Decane | 0.79 |
| Isoundecane | 3.72 |
| Isoundecene | 0.72 |
| Isododecene | 1.05 |
| n-Undecane | 0.33 |
| Isotridecene | 1.88 |
| 1-Dodecene | 0.07 |
| n-Dodecane | 0.12 |
| Isotridecene | 0.31 |
| Isopentadecene | 1.31 |
| Unknown | 11.07 |
| IN TOTAL: | |
| -anes | 19.02 |
| cyclo-anes | 10.52 |
| -enes | 50.77 |
| aromatic | 8.62 |
| others | 11.07 |
| 3. Diesel | |
| n-Pentane | 0.15 |
| 2-Methylpentane | 0.11 |
| Methylcyclopentane | 0.30 |
| 4-Methyl-2-pentene | 0.12 |
| 2,4-Dimethyl-1-pentene | 0.14 |
| 4-Methylheptane | 0.53 |
| Trimethylcyclohexane | 0.96 |
| 2,3-Dimethyl-2-heptene | 0.26 |
| 2,4-Dimethyl-1-heptene | 4.57 |
| Xylene | 0.17 |
| Trimethylcyclohexene | 0.61 |
| Isodecene | 1.57 |
| Mesitylene | 0.29 |
| Isodecene | 1.58 |
| n-Decane | 0.20 |
| Isoundecene | 5.52 |
| Isoundecene | 1.22 |

TABLE 2-continued

GC-MS Analysis of the Products of Example 1

| Compound | Wt. % |
|---|---|
| Isododecene | 17.25 |
| n-Undecane | 1.31 |
| Isotridecene | 6.28 |
| Isotridecene | 1.67 |
| Isotridecene | 0.63 |
| 1-Dodecene | 0.74 |
| n-Dodecane | 1.37 |
| Nephthalene | 0.57 |
| Isotridecane | 5.33 |
| n-Tridecane | 1.84 |
| Isopentadecene | 22.94 |
| Isohexadecene | 5.17 |
| n-Tetradecane | 0.53 |
| Dimethylnaphthalene | 0.36 |
| Isopentadecane | 0.72 |
| n-Pentadecane | 0.30 |
| Isoheptadecane | 1.89 |
| n-Hexadecane | 0.10 |
| n-Heptadecane | 0.03 |
| Unknown | 12.67 |
| IN TOTAL: | |
| -anes | 18.04 |
| cyclo-anes | 1.26 |
| -enes | 66.64 |
| aromatic | 1.39 |
| others | 12.67 |

TABLE 3

Properties of the Products of Example 1

| | Gasoline from Waste Plastic |
|---|---|
| 1. Gasoline | |
| Distillation range (°C.), start point | 64 |
| Distillation range (°C.), 10% point | 62 |
| Distillation range (°C.), 50% point | 102 |
| Distillation range (°C.), 90% point | 149 |
| Distillation range (°C.), end point | 185 |
| Percentage of distillation (%) | 97 |
| Residue (%) | 1.0 |
| Saturated vapor pressure (kPa) | 52 |
| Stability (min.) | 925 |
| Copper strip corrosion grade (50° C., 3 hours) | <1 |
| Water soluble acid or base | none |
| Acidity (mg KOH/100 ml) | 1.38 |
| RON (Octane number, research method) | 95.5 |
| MON value (Octane number, motor method) | 84 |
| Ph.D. Testing | pass |
| 2. Diesel | |
| Density at 20° C. (g/cm³) | 0.7868 |
| Distillation range (°C.), start point | 176 |
| Distillation range (°C.), 10% point | 198 |
| Distillation range (°C.), 50% point | 226 |
| Distillation range (°C.), 90% point | 259 |
| Distillation range (°C.), 90% point | 269 |
| Distillation range (°C.), end point | 290 |
| Percentage of distillation (%) | 98 |
| Cetane number | 59 |
| Condensation point (°C.) | <−30° C. |
| Pour point (°C.) | <−15 |
| Copper strip corrosion grade (50° C., 3 hours) | <1 |
| Water soluble acid or base | none |
| Acidity (mg KOH/100 ml) | 1.39 |
| Flash point (°C.) | 65.5 |
| Kinematic viscosity at 20° C. (mm²/s) | 2.57 |
| Actual gel level (mg/100 ml) | 9.2 |

What we claim is:

1. A process for producing gasoline, diesel and carbon black from a waste material comprising rubber and plastics waste, comprising the steps of:
    (a) charging the waste material into a pyrolysis device and providing heat to the waste material to heat the same to a first temperature to obtain pyrolysis thereof;
    (b) activating a stirrer mechanism in the pyrolysis device to discharge therefrom any carbon residue produced by the pyrolysis;
    (c) passing gaseous products of the pyrolysis through a purification device to perform at least one of a first desulfurization, denitrogenation and dechlorination therein;
    (d) passing the purified gaseous products into a first catalytic tracking device with a first catalyst to produce a catalytically cracked reaction product; and
    (e) fractionating a portion of the catalytically cracked reaction product to separate gasoline and diesel therefrom.

2. The process according to claim 1, wherein:
    the purification device comprises a first component for absorbing acidic gases in step (c).

3. The process according to claim 2, wherein:
    the first catalytic cracking device comprises a fixed bed constituted both for catalytic cracking and for absorbing acidic gases.

4. The process according to claim 1, wherein:
    the catalyst used in the first catalytic cracking device is prepared by homogeneously mixing 40–60% (by weight) of a synthetic carrier with 60–40% (by weight) active components, drying the resultant mixture, and calcining the same.

5. The process according to claim 4, wherein:
    the synthetic carrier is prepared by adding 1374 kg 20% sulfuric acid to 0.79 l (content of $Al_2O_3$, 46 g/l) solution of $Al_2(SO_4)_3$, stirring homogeneously, cooling to room temperature, adding thereto 4.9 l sodium silicate (content of $SiO_2$, 120 g/l) and 1700 kg kaolin, and stirring homogeneously.

6. The process according to claim 4, wherein:
    the active components are prepared by adding a suitable amount of water to 2–20% ZnNiHZSM-5, 10–50% REY zeolite, 5–10% mercerized zeolite, and 3–8% ZnO or compounds containing Zn, Ga, Pb, Cu, Ni, Pt or Fe, and then stirring homogeneously.

7. The process according to claim 1, wherein:
    the first catalyst used in the fixed bed comprises a mixture of materials A and B,
    wherein material A is prepared by mixing 30–60% of one of kaolin or activated clay, 10–30% solution of one of NaOH or KOH (content of solid, 10–20%), 10–20% of one of CaO or $CaCO_3$ (content of CaO), 10–15% of one of ZnO or soluble salt of zinc, 3–8% of one of CuO or a soluble salt of lead, and a suitable amount of binder of at least one of silicon or aluminum, washing, drying and calcining; and
    wherein material B is ZnNiHZSM-5 zeolite obtained from modified HZSM-5 zeolite with a metal, prepared by soaking HZSM-5 zeolite with a salt solution of Zn, Ni or Ga, mixing with suitable amount of a binder of Si or Al such as water glass, shaping, washing, drying, and calcining at 500°–700° C., wherein the Zn content is in the range 1–5%, the Ni content is in the range 0.5–5%, Si and Al are in a molar ratio in the range 20–200, particle size in the range 0.8–1.6 μm, and a constraint index in the range 1–12.

8. The process according to claim 7, wherein:

the content of Zn in material B is 3%, that of Ni is 1.5%, and the molar ratio of Si to Al is in the range 30:1 to 40:1.

9. The process according to claim 4, wherein:

the first catalyst is particulate.

10. The process according to claim 1, wherein:

the catalytically cracked reaction product is treated with an inorganic acid when the waste material is rubber.

11. The process according to claim 1, comprising the further step of:

(f) condensing the reaction product after step (d) to separate said portion thereof for said fractionating in step (e) from residual gases.

12. The process according to claim 11, comprising the further step of:

burning a portion of said residual gases, when available, to provide at least a portion of said heat to said pyrolysis device in step (a).

13. The process according to claim 1, wherein:

step (d) comprises, along with said catalytic cracking in said first catalytic cracking device, a simultaneous further purification of the gaseous products purified in step (c) by at least one of a further desulfurization, denitrogenation and dechlorination.

14. The process according to claim 13, wherein:

step (d) comprises the additional step of the subjecting the catalytically cracked reaction product to further catalytic cracking with a second catalyst in a second catalytic cracking device before performing the fractioning per step (e).

* * * * *